United States Patent
Kamir et al.

(10) Patent No.: US 11,036,853 B2
(45) Date of Patent: Jun. 15, 2021

(54) SYSTEM AND METHOD FOR PREVENTING MALICIOUS CAN BUS ATTACKS

(71) Applicant: ENIGMATOS LTD., Yavne (IL)

(72) Inventors: Eyal Kamir, Ganei Tikva (IL); Alexander Fok, Rehovot (IL); Yaniv Tuchman, Zichron-Yaakov (IL); Avi Bitton, Yavne (IL); Uriel Friedman, Aley Zahav (IL); Meni Dali, Petah Tikva (IL); Yoni Malka, Aley Zahav (IL)

(73) Assignee: ENIGMATOS LTD., Yavne (IL)

( * ) Notice: Subject to any disclaimer, the term of this patent is extended or adjusted under 35 U.S.C. 154(b) by 0 days.

(21) Appl. No.: 16/618,934

(22) PCT Filed: Aug. 1, 2018

(86) PCT No.: PCT/IL2018/050858
§ 371 (c)(1),
(2) Date: Dec. 3, 2019

(87) PCT Pub. No.: WO2019/026077
PCT Pub. Date: Feb. 7, 2019

(65) Prior Publication Data
US 2020/0143049 A1 May 7, 2020

Related U.S. Application Data

(60) Provisional application No. 62/540,160, filed on Aug. 2, 2017.

(51) Int. Cl.
*G06F 21/55* (2013.01)
*B60R 25/30* (2013.01)
(Continued)

(52) U.S. Cl.
CPC ........ *G06F 21/554* (2013.01); *B60R 16/0232* (2013.01); *B60R 16/0239* (2013.01);
(Continued)

(58) Field of Classification Search
CPC . G06F 21/554; G06F 2221/034; B60R 25/30; H04L 12/40013; H04L 67/12
See application file for complete search history.

(56) References Cited

U.S. PATENT DOCUMENTS 5,938,754 A * 8/1999 Edwards .............. H01R 31/005
710/305
6,173,814 B1 * 1/2001 Herkel ...................... B66B 1/34
187/248
(Continued)

FOREIGN PATENT DOCUMENTS

EP 3133774 A1 2/2017
EP 3142289 A1 3/2017

OTHER PUBLICATIONS

NPL Search (Google Scholar) (Year: 2021).*
(Continued)

*Primary Examiner* — Mahfuzur Rahman
*Assistant Examiner* — Richard W Cruz-Franqui
(74) *Attorney, Agent, or Firm* — Polsinelli PC

(57) ABSTRACT

A system for preventing cyber security attacks over the CAN bus of a vehicle, from carrying out their plot. The system includes a teleprocessing device that is provided with the message identifier of at least one ECU to be blocked. The teleprocessing device is configured to read the message identifier of CAN messages, to thereby identify the at least one ECU to be blocked. Upon determining that the vehicle is under a cyber security attack, the ECU blocking device is activated. Upon identifying that a message was transmitted by the at least one ECU to be blocked, then during the CAN
(Continued)

bus 'bit monitoring' process, before the at least one ECU to be blocked reads back the transmitted signal, the ECU blocking device alters one or more bits of the transmitted signal, to thereby force the message to be an erroneous CAN message.

12 Claims, 3 Drawing Sheets

(51) Int. Cl.
| | |
|---|---|
| H04L 12/40 | (2006.01) |
| H04L 29/08 | (2006.01) |
| G06N 20/00 | (2019.01) |
| B60R 16/023 | (2006.01) |
| G06F 17/17 | (2006.01) |
| G06F 21/56 | (2013.01) |
| G06F 21/71 | (2013.01) |
| G06N 5/04 | (2006.01) |

(52) U.S. Cl.
CPC .............. *B60R 25/30* (2013.01); *G06F 17/17* (2013.01); *G06F 21/566* (2013.01); *G06F 21/71* (2013.01); *G06N 5/04* (2013.01); *G06N 20/00* (2019.01); *H04L 12/40013* (2013.01); *H04L 67/12* (2013.01); *G06F 2221/034* (2013.01); *H04L 2012/40215* (2013.01); *H04L 2012/40273* (2013.01)

(56) References Cited

U.S. PATENT DOCUMENTS

| | | | | |
|---|---|---|---|---|
| 6,267,219 | B1* | 7/2001 | Spannhake | B66B 27/00 198/323 |
| 6,886,116 | B1* | 4/2005 | MacLellan | G06F 11/2215 714/25 |
| 7,305,597 | B1* | 12/2007 | Andreev | G11C 29/1201 714/718 |
| 8,239,597 | B2* | 8/2012 | Wishneusky | H02J 1/102 710/119 |
| 9,616,828 | B2 | 4/2017 | Ben Noon et al. | |
| 10,142,358 | B1* | 11/2018 | Bajpai | H04L 63/1466 |
| 2003/0115543 | A1* | 6/2003 | Emde | H04L 12/4135 714/800 |
| 2007/0208470 | A1* | 9/2007 | Itabashi | H04L 12/4135 701/36 |
| 2011/0231053 | A1* | 9/2011 | Kuramochi | H04L 12/40032 701/31.4 |
| 2015/0020152 | A1* | 1/2015 | Litichever | H04L 12/40143 726/1 |
| 2015/0089236 | A1* | 3/2015 | Han | H04W 12/10 713/181 |
| 2015/0093108 | A1* | 4/2015 | Hirth | H04J 14/086 398/34 |
| 2015/0191135 | A1* | 7/2015 | Ben Noon | H04L 63/1408 726/22 |
| 2016/0019389 | A1* | 1/2016 | Yan | H04W 12/128 726/23 |
| 2016/0294855 | A1* | 10/2016 | Maeda | H04L 12/28 |
| 2017/0063996 | A1* | 3/2017 | Kaster | H04L 63/1425 |
| 2017/0109521 | A1* | 4/2017 | Ujiie | B60R 16/0231 |
| 2018/0025156 | A1* | 1/2018 | Dagan | H04L 63/1483 713/161 |
| 2018/0227306 | A1* | 8/2018 | Borkowicz | H04L 12/40013 |
| 2019/0052654 | A1* | 2/2019 | Juliato | G06F 21/64 |
| 2019/0065544 | A1* | 2/2019 | O'Brien | H04L 9/0637 |
| 2020/0143049 | A1* | 5/2020 | Kamir | H04L 67/12 |

OTHER PUBLICATIONS

International Search Report; PCT Application No. PCT/IL2018/050858; dated Oct. 29, 2018.
Written Opinion of PCT Application No. PCT/IL2018/050858; dated Oct. 29, 2018.
Wool Avishai "A Software-Based Anti-Spoofing Defense System for the CAN Bus; Cyber Security" Obtained on Nov. 27, 2019.
International Preliminary Report on Patentability of PCT Application No. PCT/IL2018/050858; dated Nov. 6, 2019.
CAN Bus Error Handling; retrieved from https://www.kvaser.com/about-can/the-can-protocol/can-error-handling/; May 5, 2020.
Canadian Examination Requisition dated Apr. 6, 2020.
T. Matsumoto, M. Hata, M. Tanabe, K. Yoshioka and K. Oishi, "A Method of Preventing Unauthorized Data Transmission in Controller Area Network," 2012 IEEE 75th Vehicular Technology Conference (VTC Spring), Yokohama, 2012, pp. 1-5, doi: 10.1109/VETECS. 2012.6240294.

* cited by examiner

SYSTEM AND METHOD FOR PREVENTING MALICIOUS CAN BUS ATTACKS

CROSS-REFERENCE TO RELATED APPLICATIONS

This application is a national stage entry of PCT/IL2018/050858 filed Aug. 1, 2018 which claims convention priority from U.S. patent application 62/540,160 filed on Aug. 2, 2017, the contents each of which are hereby incorporated by reference in their entirety.

FIELD OF INVENTION

The present invention is directed to systems and processes for preventing cyber security attacks on the CAN bus of a vehicle, from carrying out their plot, and more particularly, to systems and processes for blocking messages from at least one selected ECU, either preinstalled by the OEM or installed as an aftermarket ECU, upon determining that the vehicle is under a cyber security attack.

BACKGROUND AND PRIOR ART

Vehicles are commonly computerized to control a plurality of the vehicles components via the vehicle's standard bus, being a Controller Area Network (CAN) bus. The CAN-bus is a vehicle bus standard designed to allow electronic control units (ECUs) such as microcontrollers and devices to communicate with each other in applications without a host computer.

The CAN-bus a message-based protocol. Typically, an ECU is configured to transmit a message over the CAN bus that complies with the CAN-bus a message-based protocol. A CAN bus message consist of message identifier, Control, Data, CRC and ACK. Reference is made to FIG. 1 that schematically shows the fields of the message-based protocol 25 utilized by a CAN-bus 20 of vehicle 10. The CAN-bus messages 25 consist of a message identifier 24, Control 26, Data 28, CRC 30 and Ack 32, each field having a string of bits having a predesigned length.

The Message Identifier 24 defines the level of priority of the data protocol. Depending on the standard being used, the length of the frames can be in two formats: the standard format that uses an 11-bits arbitration ID, and the extended format that uses a 29-bits arbitration ID, wherein SF field 22 indicates which of the two formats is used.

The Control Field 26, also known as the Check Field, displays the number of items of information contained in the data field. The Control field allows any receiver of the message to check whether the received message has all the information transferred.

The Data Field 28 contains the information transmitted on the bus and that can be read by any other CAN Node, wherein each Electronic Control Units (ECUs) operatively connected to the CAN-bus is referred to as node.

The CRC Field 30 is a Cyclic Redundancy Check field that contains a 15-bits cyclic redundancy check code.

The ACK Field 32, being the Acknowledge Field, allows any receiver of the transmitted message to signal to the transmitter that it has correctly received the data protocol. If an error is detected, the receiver notifies the transmitter of the error immediately. The transmitter may then resend the data protocol.

A hacker, an attacker or a potential attacker can connect his own unit to the network, send malicious messages and commands, impersonate legitimate commands of other ECUs and cause scenarios that can be used for inflicting damages, extortion, endangering human lives and properties.

There is therefore a need for means and methods for preventing cyber security attacks from carrying out their plot.

The terms "car" and "vehicle" are used herein interchangeably.

ABBREVIATIONS

BUS A network topology in which nodes are directly connected to a common linear (or branched) half-duplex link.
CAN Control Area Network
CRC Cyclic Redundancy Check
ECU Electronic Control Unit
ERR Error
FlexRay An automotive network communications protocol developed to govern on-board automotive computing. It is designed to be faster and more reliable than CAN and TTP, but it is also more expensive
MSE Mean squared error
FPGA Field-Programmable Gate Array
TTP Time-Triggered Protocol, an open computer network protocol for control systems. It was designed as a time-triggered fieldbus for vehicles and industrial applications

SUMMARY OF INVENTION

The principal intentions of the present invention include providing a system for preventing on the CAN bus of a vehicle a cyber security attack on the CAN bus of a vehicle, by blocking a pre-selected ECU or blocking the attacking ECU. It is assumed that the malicious attack intends to take control of the whole vehicle or specific control function (e.g. washers control) and therefore, the objective is to neutralize a vulnerable ECU, either an original—produced and installed by the OEM (such as, with no limitations, the ECU that controls the ignition), or one that was attached later at aftermarket stage, such as, with no limitations, OBD dongle, telematics device, antitheft device, etc.

The system of present invention can be deployed in existing car architectures and does not require significant car architecture modifications.

According to the teachings of the present invention there is provided an example system for preventing cyber security attacks, over the CAN bus of a vehicle, from carrying out their plot. The system includes a teleprocessing device coupled with digital memory, and an ECU blocking device.

The digital memory holds the message identifier of at least one ECU to be blocked, wherein the message identifier includes the message identifier 24, and optionally, at least a portion of the data field 28 of a CAN message as typically used by the at least one ECU to be blocked.

The teleprocessing device is configured to read the message identifier of CAN messages, to thereby identify the at least one ECU to be blocked.

Upon determining that the vehicle is under a cyber security attack, the teleprocessing device activates the ECU blocking device to thereby facilitate blocking the at least one ECU to be blocked. Upon identifying that a message was transmitted by the at least one ECU to be blocked, then during the CAN bus 'bit monitoring' process, before the at least one ECU to be blocked reads back the transmitted signal containing the transmitted message, the ECU blocking device alters one or more bits of the transmitted signal, to thereby force the message to be an erroneous CAN message.

Preferably, the altering of the one or more bits of the transmitted signal includes inverting one or more "1" bits to "0" to thereby forcing the message to be an erroneous CAN message. Preferably, the inverting of one or more "1" bits to "0" includes forming a string of at least six "0" bits in a row, to thereby forcing the message to be an erroneous CAN message.

Optionally, the altering of the one or more bits of the transmitted signal includes inverting one or more "0" bits to "1" to thereby forcing the message to be an erroneous CAN message.

Optionally, the altering of the one or more bits of the transmitted signal includes inverting one or more "1" bits to "0" and one or more "0" bits to "1", to thereby forcing the message to be an erroneous CAN message.

The ECU blocking device may be embodied in a single unit or in a number of units.

Optionally, the system further includes a cloud-based server having a cloud-based processing device, wherein the cloud-based processing device operates at some of the operations of the teleprocessing device. Optionally, the digital memory is part of the cloud-based server.

According to further teachings of the present invention there is provided an example process for preventing cyber security attacks, over the CAN bus of a vehicle, from carrying out their plot, the process including the steps of:
 a. providing a teleprocessing device;
 b. providing an ECU blocking device;
 c. providing at least one ECU to be blocked;
 d. detecting a selected message prefix;
 e. upon determining that the vehicle is under a cyber security attack, the ECU blocking device is activated to thereby facilitate blocking the at least one ECU to be blocked; and
 f. upon identifying that a message was transmitted by the at least one ECU to be blocked, then during the CAN bus 'bit monitoring' process and before the at least one ECU to be blocked reads back the transmitted signal containing the transmitted message, altering one or more bits of the transmitted signal by the ECU blocking device.

Preferably, the altering of the one or more bits of the transmitted signal includes inverting one or more "0" bits to "1" to thereby forcing the message to be an erroneous CAN message. Preferably, the inverting of one or more "0" bits to "1" includes forming a string of at least six "0" bits in a row, to thereby forcing the message to be an erroneous CAN message.

Optionally, the altering of the one or more bits of the transmitted signal includes inverting one or more "1" bits to "0" to thereby forcing the message to be an erroneous CAN message.

Optionally, the altering of the one or more bits of the transmitted signal includes inverting one or more "1" bits to "0" and one or more "0" bits to "1", to thereby forcing the message to be an erroneous CAN message.

Optionally, the message identifier includes at least a portion of the data field of a CAN message.

Optionally, the ECU blocking device is embodied in a single unit or a in number of units.

This document reference terms that are used consistently or interchangeably herein. These terms, including variations thereof, are as follows.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A server is typically a remote computer or remote computer system including a cloud-based computer/server, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software-based emulation of a computer.

It should be noted that where the present invention is described in terms of the server configured to be a cloud-based server, it is given by way of example only, with no limitation, and any other type of server known in the art may be used.

Unless otherwise defined herein, all technical and/or scientific terms used herein have the same meaning as commonly understood by one of ordinary skilled in the art to which the invention pertains. Although methods and materials similar or equivalent to those described herein may be used in the practice or testing of embodiments of the invention, example methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF SOME EMBODIMENTS OF THE INVENTION

Figure 1:
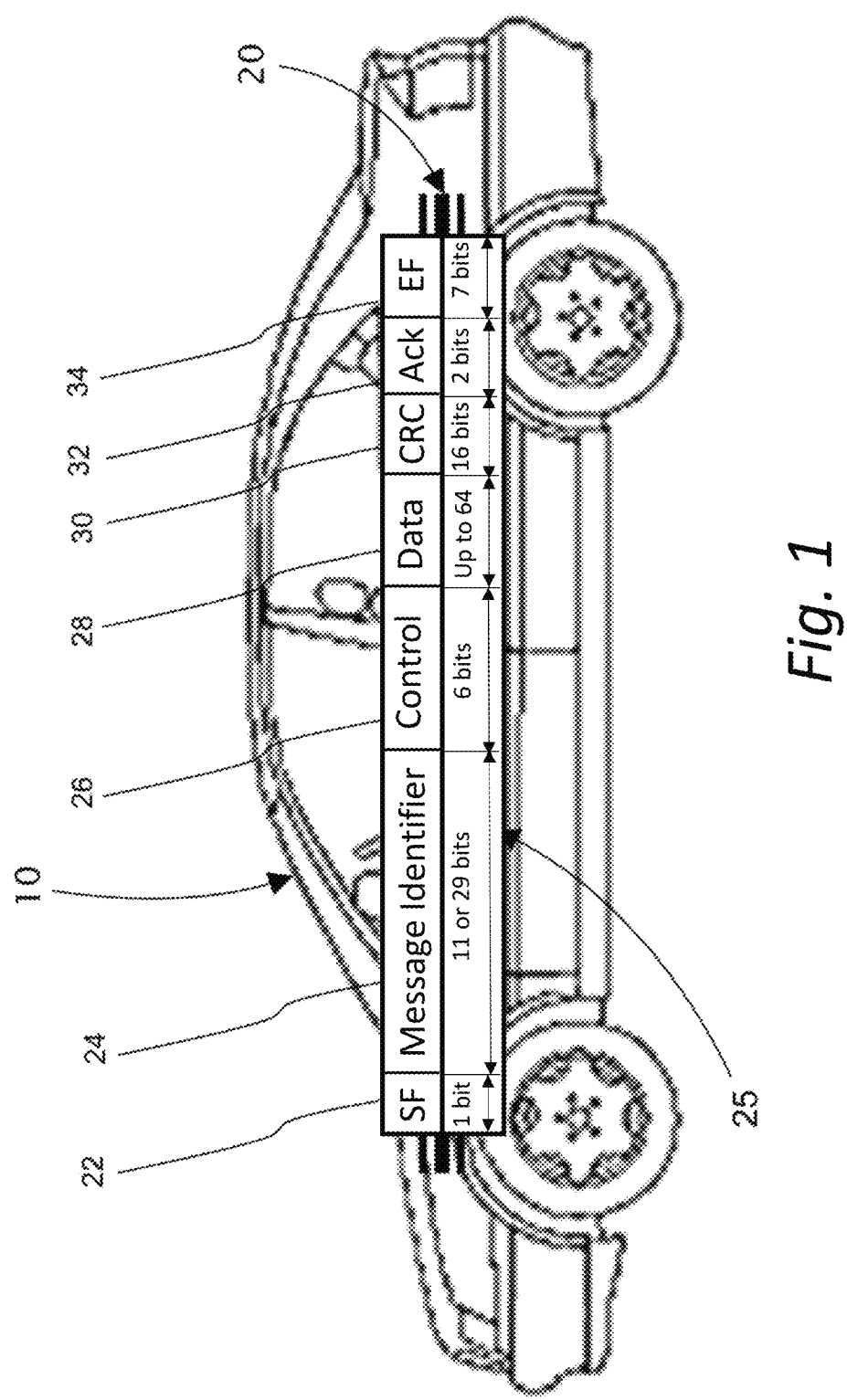
FIG. 1 (prior art) shows the fields of the message-based protocol utilized by a CAN-bus of vehicle.

Before explaining at least one embodiment of the invention in detail, it is to be understood that the invention is not necessarily limited in its application to the details of construction and the arrangement of the components and/or methods/processes set forth in the following description and/or illustrated in the drawings. The invention is capable of other embodiments or of being practiced or carried out in various ways.

As will be appreciated by one skilled in the art, aspects of the present invention may be embodied as a system, methods/processes or as computer program products. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

An embodiment is an example or implementation of the invention. The various appearances of "one embodiment," "an embodiment" or "some embodiments" do not necessarily all refer to the same embodiment. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the invention. It is understood that the phraseology and terminology employed herein are not to be construed as limiting and are for descriptive purpose only.

Throughout this document, numerous textual and graphical references may be made to trademarks, and domain names. These trademarks and domain names are the property of their respective owners, and are referenced only for explanation purposes herein.

It should be noted that orientation related descriptions such as "bottom", "up", "upper", "down", "lower", "top" and the like, assumes that the associated vehicle is operationally situated.

Figure 2:
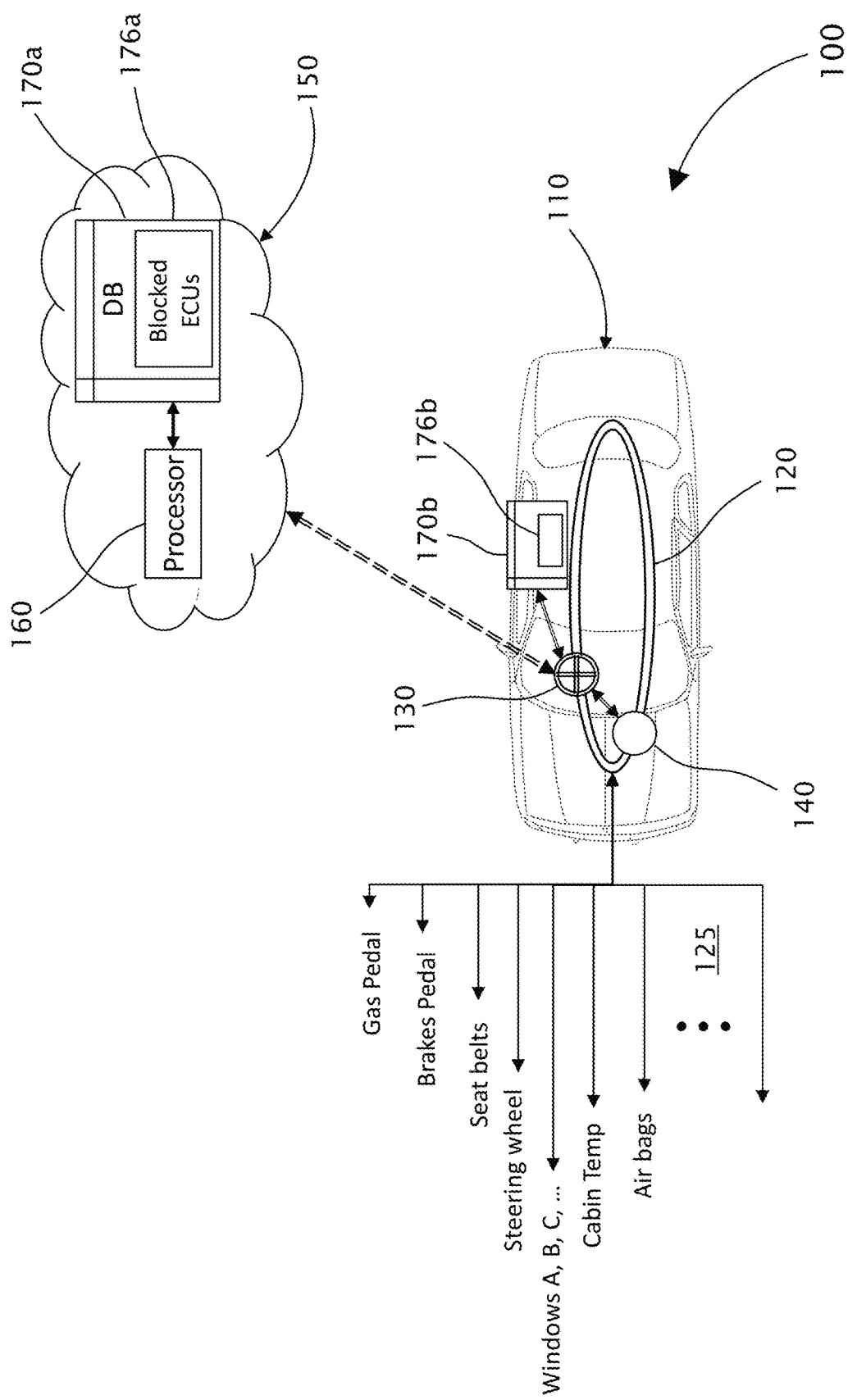
FIG. 2 is a schematic diagram showing an example vehicle-identification system for preventing malicious attacks over a vehicle's CAN bus from carrying out their plot, according to embodiments of the present invention.

FIG. 2 is a schematic diagram showing an example vehicle-identification system 100 for preventing malicious attacks over a vehicle's CAN bus from carrying out their plot, according to embodiments of the present invention. Vehicle-attack-prevention system 100 includes a vehicle 110 having a CAN-bus 120, at least one teleprocessing device 130 and at least one ECU blocking device 140. It should be noted that CAN-bus messages are transmitted by components 125 of vehicle 110 that are in communication flow with CAN-bus 120, wherein these components 125 of vehicle 110 are configured to transmit and/or read messages via CAN-bus 120. Optionally, a database (DB) 170b configured support teleprocessing device 130 and to store, for example, blocked ECUs related data 176b.

The ECU blocking device 140 is configured to receive an instruction to block messages from at least one selected ECU $125_i$, typically an essential ECU 125. The selected ECU 125, may be preselected or provided as part of the blocking instruction. It should be noted that the instruction to block a selected ECU $125_i$ may be provided by teleprocessing device 130 or remotely, for example, a remote server, such as cloud-based server 150. Optionally, a database (DB) 170a configured a processing device 160 of cloud-based server 150, and to store, for example, blocked ECUs related data 176a. Processing device 160 may operate in addition or instead of teleprocessing device 130. DB 170a may be used in parallel to, or instead of DB 170b.

The ECU blocking device 140 is a CAN compatible device that is configured to read a message identifier 24 and optionally, at least a portion of data field 28 of CAN messages, and upon identifying that a message was transmitted by the selected ECU $125_i$, inverting "1" bits to "0" and/or "0" bits to "1" to thereby forcing the message to be an erroneous CAN message. Alternatively, upon identifying that the message was transmitted by the selected ECU $125_i$, replace each of at least 6 (six) consecutive bits, being either a "1" or a "0" by a "0", to thereby make the message an erroneous CAN message. Alternatively, upon identifying that the message was transmitted by the selected ECU $125_i$, replace each of at least 6 (six) consecutive bits, being either a "1" or a "0" by a "1", to thereby make the message an erroneous CAN message. ECU blocking device 140 may be embodied as a single unit or a number of units.

As part of the standard CAN bus error detection mechanisms, the CAN protocol includes a 'bit monitoring' process. Each transmitter on the CAN bus monitors (i.e. reads back) the transmitted signal level. That is, the transmitter first transmits the message signal, and then reads back the transmitted signal to ensure that the read signal and the transmitted signal are the same. If the bit level the read signal differs from the one transmitted, a bit-error is signaled. However, no bit error is raised during the arbitration process.

The present invention takes advantage of the CAN bus 'bit monitoring' process, wherein after the initial CAN message transmission by the selected ECU $125_i$ and before the selected ECU $125_i$ reads back the transmitted signal (as part of the CAN bus 'bit monitoring' process), the ECU blocking device 140 intervenes in the monitoring process, by altering bits of the initially transmitted signal by the selected ECU $125_i$.

Figure 3:
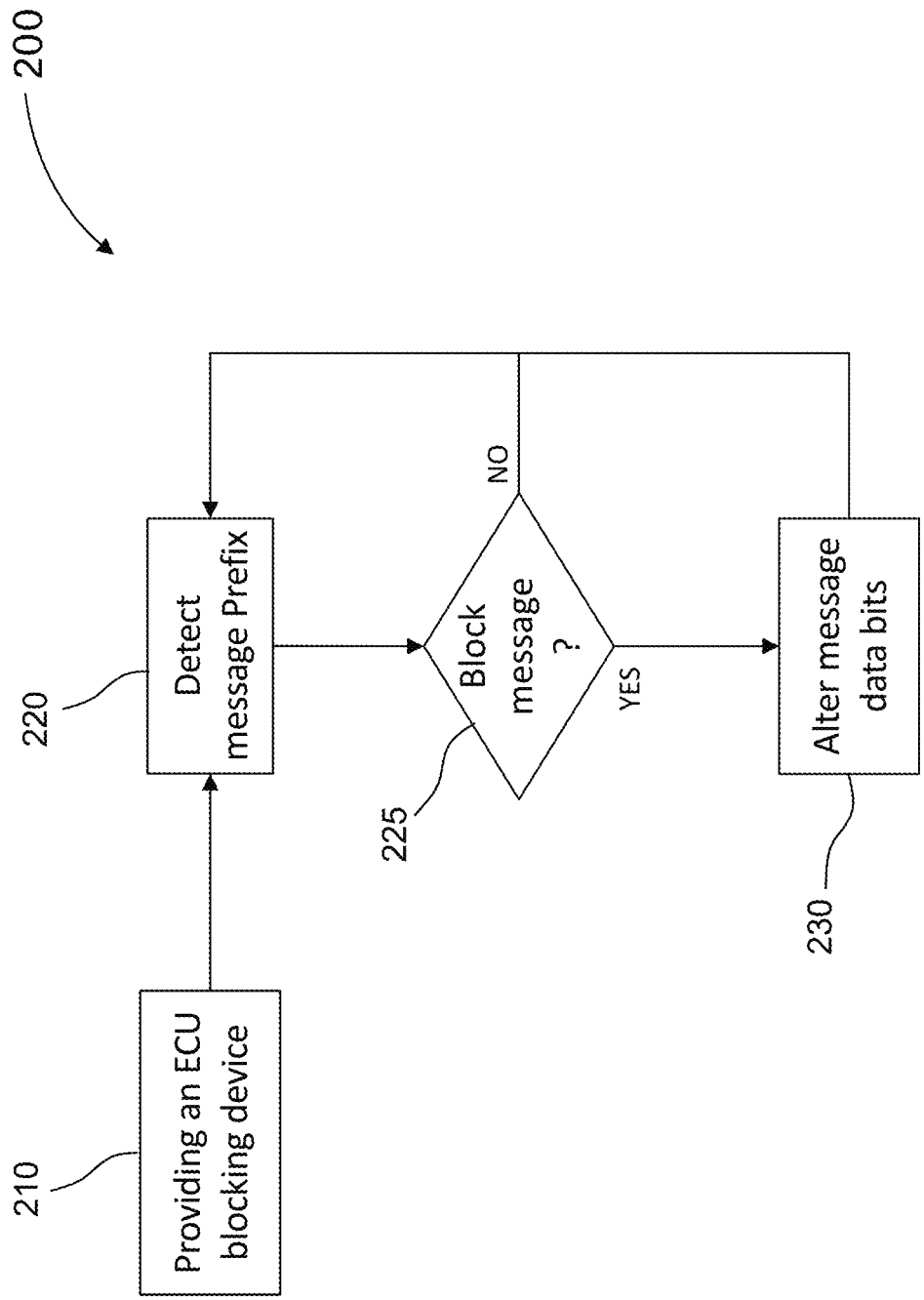
FIG. 3 is a schematic flow chart diagram showing an example process for preventing malicious attacks on a vehicle's CAN bus from carrying out their plot, by blocking CAN messages transmitted by a selected ECU, according to embodiments of the present invention.

The schematic flow chart 200 shown in FIG. 3 describes an embodiment process preventing malicious attacks on a vehicle's CAN bus from carrying out their plot, by blocking CAN messages transmitted by a selected ECU $125_i$. Process 200 proceeds as follows:

Step 210: providing an ECU blocking device.
As a preliminary step, an ECU blocking device 140 is placed on CAN bus 120, wherein ECU blocking device 140 is a CAN compatible device, configured to read a message identifier 24.

Step 220: detecting a selected message prefix.
While reading CAN messages, teleprocessing device 130 inspects the message identifier 24 and optionally, at least a portion of the message data field 28, of the read messages.

The following is a non-limiting example (non?): a message "111×60" has an ID=111 and contains vehicle speed of 60 km/h in the data field. This message is legitimate and is sent by a legal ECU. Now an attacker wants to deceive the dashboard and sends a message 111×180, that is, having the same ID=111 and speed 180 km/h. When such a message is detected, teleprocessing device 130 may decide, for example based on an instruction to ECU blocking device 140, that the ECU sending this message should be blocked. It should be noted that a legitimate command 111×60 will not be affected.

Step 225: checking if a read message identifier is that of the selected ECU.

ECU blocking device 140 check if a read message identifier 24 of the read CAN message is that of selected ECU 125$_i$.

If not, go to step 210.

Step 230: alter identified selected message.

It has been determined that the read message identifier of a CAN message is that of selected ECU 125$_i$.

ECU blocking device 140 alters a number data bit of the identified selected message, to thereby deform the message to an erroneous CAN message, wherein the deformation takes place before the CAN message is read back by selected ECU 125$_i$, as part of the 'bit monitoring' feature according to the CAN bus protocol.

Go back to step 210.

[end of process 200]

It should be noted that bit inversion performed in step 220 must be performed in a substantially faster rate, wherein the bit inversion rate is >>than the CAN bus bit transmission rate.

EXAMPLE

In a non-limiting example, the CAN bus bit transmission rate is 1 Mbps (Mbits/sec). That is, each bit-time slot is 1 μs (microsecond) long. In such a system, the inversion of a 25 bit may take between several ns (nanoseconds) to several dozen ns. In a non-limiting example, the bit inversion is embodied using a fast-enough FPGA component and a CAN transceiver.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A system for preventing cyber security attacks on a Controller Area Network (CAN) bus of a vehicle, the system comprising:
   a. a teleprocessing device coupled with a digital memory; and
   b. an Electronic Control Unit (ECU) blocking device;
   wherein said digital memory is configured to store one or more message identifiers of malicious ECUs to be blocked;
   wherein said teleprocessing device is configured to read a message identifier of each of CAN messages transmitted by ECUs, thereby to identify at least one malicious ECU; and
   upon detecting a message transmission by a malicious ECU, said teleprocessing device is configured to activate said ECU blocking device to alter one or more bits in the message to a respective altered bit, wherein the alteration of each bit to the altered bit is performed, respectively, during a 'bit monitoring' process of the CAN bus and before the malicious ECU reads back the bit such that the malicious ECU reads back the altered bit and faces a plurality of 'bit monitoring' errors, that block the malicious ECU based on the 'bit monitoring' process in accordance with the CAN bus protocol.

2. The system as in claim 1, wherein said alteration of said one or more bits comprises inverting one or more "1" bits to "0", thereby to force blocking of the message transmission in view of a 'bit monitoring error' of the malicious ECU.

3. The system as in claim 1, wherein said ECU blocking device is embodied in a single unit or in a number of units.

4. The system as in claim 1, wherein said message identifier further includes at least a portion of a data field of a CAN message.

5. The system as in claim 1, wherein said teleprocessing device is configured to read the message identifier and at least a portion of a data field of a CAN message, to thereby identify said malicious ECU.

6. The system as in claim 1, comprising a cloud-based server having a cloud-based processing device.

7. The system as in claim 6, wherein said cloud-based server stores blocked-ECU related data and operates in addition to or instead of said teleprocessing device.

8. A process for preventing cyber security attacks over a Controller Area Network (CAN) bus of a vehicle, the process comprising the steps of:
   a. providing a teleprocessing device;
   b. providing an Electronic Control Unit (ECU) blocking device;
   c. providing a memory storage containing identifiers of at least one malicious ECU to be blocked;
   d. reading identifiers of messages flowing over the CAN bus;
   e. upon detecting a message identifier in a transmitted message that relates to a malicious ECU to be blocked, activating the ECU blocking device to alter one or more following bits of said transmitted message to a respective altered bit, wherein said alteration of each bit is performed during a 'bit monitoring' process of the CAN bus and before said malicious ECU reads back the bit such that the malicious ECU reads back the altered bit and faces a plurality of 'bit monitoring errors', that block the malicious ECU based on the 'bit monitoring' process in accordance with the CAN bus protocol.

9. The process as in claim 8, wherein said alteration of said one or more following bits comprises inverting one or more "1" bits to "0" to thereby block said malicious ECU.

10. The process as in claim 8, wherein said alteration of said one or more following bits comprises inverting one or more "1" bits to "0", thereby to force the altered bits to be erroneous to the reading back by the malicious ECU.

11. The process as in claim 8, wherein an identification that any given message was transmitted by said malicious ECU comprises identifying the message identifier and at least a portion of a data field of said given message.

12. The process as in claim 11, wherein said ECU blocking device is embodied in a single unit or in a number of units.

* * * * *